United States Patent
Smith et al.

(10) Patent No.: US 11,200,053 B2
(45) Date of Patent: Dec. 14, 2021

(54) DEPLOYMENT MODELS

(71) Applicant: Affirm, Inc., San Francisco, CA (US)

(72) Inventors: Adam Smith, San Francisco, CA (US); Tarak Upadhyaya, San Francisco, CA (US); Juan Lozano, San Francisco, CA (US); Daniel Hung, San Francisco, CA (US)

(73) Assignee: Affirm, Inc., San Francisco, CA (US)

( * ) Notice: Subject to any disclaimer, the term of this patent is extended or adjusted under 35 U.S.C. 154(b) by 107 days.

(21) Appl. No.: 16/680,126

(22) Filed: Nov. 11, 2019

(65) Prior Publication Data

US 2020/0150953 A1     May 14, 2020

Related U.S. Application Data

(60) Provisional application No. 62/758,489, filed on Nov. 9, 2018.

(51) Int. Cl.
| | |
|---|---|
| *G06F 9/44* | (2018.01) |
| *G06F 8/75* | (2018.01) |
| *G06F 11/34* | (2006.01) |
| *G06F 21/60* | (2013.01) |
| *G06Q 20/12* | (2012.01) |
| *G06F 8/71* | (2018.01) |
| *G06N 20/00* | (2019.01) |

(52) U.S. Cl.
CPC .............. *G06F 8/75* (2013.01); *G06F 8/71* (2013.01); *G06F 11/3438* (2013.01); *G06F 21/602* (2013.01); *G06N 20/00* (2019.01); *G06Q 20/123* (2013.01)

(58) Field of Classification Search
CPC .......... G06F 8/71; G06F 8/75; G06F 11/3438; G06F 21/602; G06N 20/00; G06Q 20/123
USPC ............... 717/101–103, 120–121, 131
See application file for complete search history.

(56) References Cited

U.S. PATENT DOCUMENTS

| | | | |
|---|---|---|---|
| 7,343,529 B1 * | 3/2008 | Klinkner | G06F 11/0748 714/57 |
| 7,694,223 B2 * | 4/2010 | Corson | G06F 9/45512 715/704 |
| 8,504,994 B2 * | 8/2013 | Golender | G06F 9/547 717/128 |
| 9,417,985 B2 * | 8/2016 | Baars | G06F 11/3604 |
| 10,496,516 B2 * | 12/2019 | Ham | G06F 8/33 |
| 2007/0156727 A1 | 7/2007 | Lim | |
| 2012/0215598 A1 | 8/2012 | Georgis et al. | |

(Continued)

OTHER PUBLICATIONS

Alexander et al., "AppMonitor: A Tool for Recording User Actions in Unmodified Windows Applications", 2008 Psychonomic Society, Inc., pp. 413-421. (Year: 2008).*

(Continued)

*Primary Examiner* — Ted T. Vo
(74) *Attorney, Agent, or Firm* — Burr & Forman, LLP

(57) ABSTRACT

A system and method may be provided for performing code analysis on a system of remote computer nodes. Input data may be collected on a local computer system along with a request for code analysis. The input data and request may be transmitted to a network of remote nodes. The network of remote nodes may perform the code analysis task using the input data. The results of the analysis may be returned back to the local computer.

30 Claims, 11 Drawing Sheets

(56) References Cited

U.S. PATENT DOCUMENTS

2016/0078229 A1    3/2016   Gong et al.

OTHER PUBLICATIONS

Olga Dolinskaja, "Remote Code Analysis in ATC for Developers", 2017, SAP Blogs, 39 pages. (Year: 2017).*
International Search Report and Written Opinion in International Application No. PCT/US2019/060797, dated Jan. 27, 2020.

* cited by examiner

DEPLOYMENT MODELS

CROSS-REFERENCE TO RELATED APPLICATIONS

This application claims the benefit of U.S. Provisional Patent Application No. 62/758,489, filed Nov. 9, 2018, which is hereby incorporated by reference in its entirety.

FIELD OF INVENTION

The present disclosure relates generally to methods and systems for executing code analysis during programming and development.

BACKGROUND

Code analysis has proven to be an effective tool to help programmers be more effective and efficient. This effectiveness is reflected by the popularity of IDE's, the rich ecosystem of editor plugins, and other analysis-enabled tools that programmers commonly use. Traditionally analysis has been performed on the local computer of the programmer. However, as code analysis techniques have evolved, code analysis has become more resource intensive. At times, the resource requirements of performing code analysis may exceed the limits of the local computer. For example, in some cases, the processing resources of the local computer are insufficient to perform analysis in a reasonable amount of time or there is insufficient memory to perform certain kinds of analyses. In other cases, results of analysis may be too large to save on the local computer. These constraints place an upper limit on the quality, depth, or completeness that code analysis methods may achieve. It would be desirable to implement a code analysis system which is capable of scaling to meet resource requirements of code analysis.

SUMMARY

In some embodiments, a method of data collection and processing is provided for collecting data on a local computer and transmitting the data to a network of remote nodes for code analysis. The code analysis results may be returned to the local computer for interpretation by the user or stored remotely in the network and served to the local computer. In some embodiments, the data collection and transmission to and management of the remote nodes is performed by a programming co-pilot system. Aspects may include local data collection, code analysis execution, analysis result distribution, and compensation processing.

Some embodiments relate to a computer-implemented method for code analysis. The programming co-pilot system may collect input data from a local computer and receive a request for code analysis. The input data and request for code analysis may be transmitted to a network of remote nodes. Code analysis may be performed by the network of remote nodes. Code analysis results may be received by the programming co-pilot system from the remote nodes.

One embodiment relates to a method for performing code analysis using data related to programming activities. The method may include collecting input data from a local computer. The input data may include at least one of a source code file, recorded actions in an editor, recorded actions in a terminal, recorded actions in a web browser, or recorded actions in an emulator. The method may include receiving a request for code analysis and transmitting the input data and the request for code analysis to a network of remote nodes. The method may include performing, by the remote nodes, analysis on the input data. The method may include receiving analysis results from the remote nodes.

BRIEF DESCRIPTION OF THE DRAWINGS

The present disclosure will become better understood from the detailed description and the drawings, wherein.

DETAILED DESCRIPTION

Figure 1:
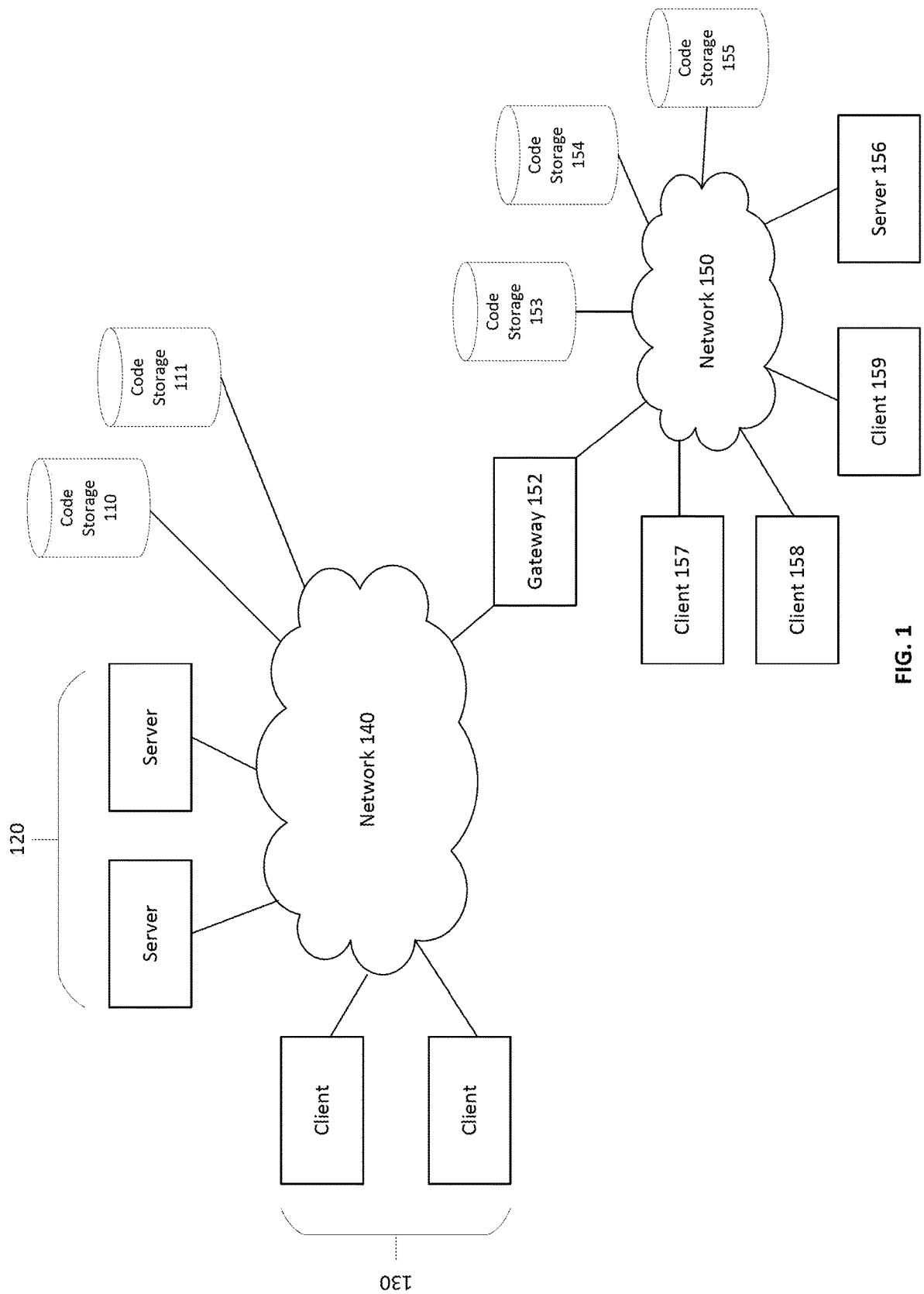
FIG. 1 illustrates an exemplary network environment that may be used in an embodiment.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 is a block diagram illustrating an exemplary network environment that may be used in an embodiment.

The network environment may include one or more clients and servers connected via a network 140. The network 140 may include a local area network (LAN), a wide area network (WAN), a telephone network, such as the Public Switched Telephone Network (PSTN), an intranet, the Internet, or a combination of networks. The network may include external code storage 110, 111 that store computer code, such as source code. Some external code storage 110, 111 may be globally accessible to any entity on the network 140. Other external code storage 110, 111 may be private and require login-in and authentication to access. The network 140 may include various entities such as servers 120 and clients 130.

Local network 150 may connect to network 140 through gateway 152. In some embodiments, the local network 150 may be private and access controlled so that entities on the network 140 cannot generally access the resources on local network 140. However, entities on the local network 150 may access and share at least some of the resources on the local network 150. Code storage 153 may comprise code stored on the local network 150 after having been web scraped from external code sources 110, 111. Code storage 154 may exist on the local network 150 and may store code from a team of programmers working from clients 157, 158, 159 on the local network 150. In an embodiment, a code storage 155 is an individual code storage that stores code of just one of the programmers on the team. The code storage 155 may be separate from code storage 154 or may be, for example, a subset of code storage 154. Code storage may be any kind of storage. In some embodiments, a code storage comprises a codebase, which is a collection of code for building one or a set of software systems, applications, or software components. Moreover, in some embodiments, a codebase comprises a code repository, where a repository keeps track of changes in the codebase over time and may allow version control and allowing checking in and checking out of code. In some embodiments, code storage comprises a database. A database may comprise any kind of storage and no particular type of database is required. For example, a database may comprise storage of files in memory or permanent storage. Server 156 may exist on the local network 150 and run a program comprised of code from the team of programmers. The code may be team code stored in code storage 154 or an individual branch or subset stored on code storage 155. Server 156 may generate logs or output during the execution of the program, and the logs or output may be retrieved by clients 157, 158, 159 for monitoring or debugging of the program.

Additional servers, clients, computer systems, and local networks may be connected to network 140. It should be understood that where the terms server, client, or computer system are used, this includes the use of networked arrangements of multiple devices operating as a server, client, or computer system. For example, distributed or parallel computing may be used.

Figure 2A:
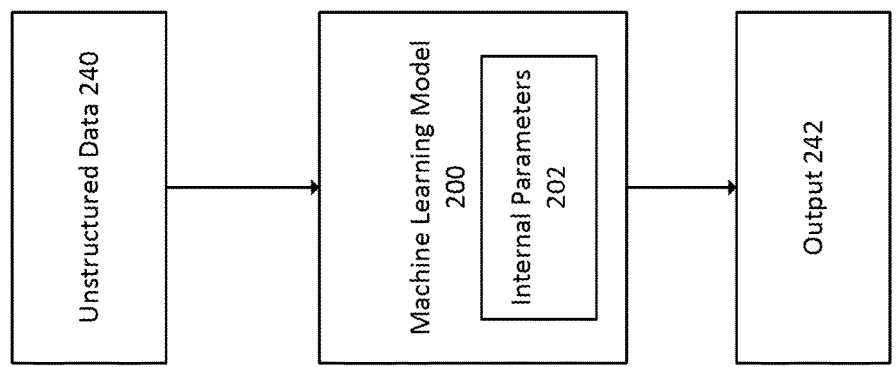
FIG. 2A illustrates an exemplary machine learning model that may be used in an embodiment.
Figure 2A:
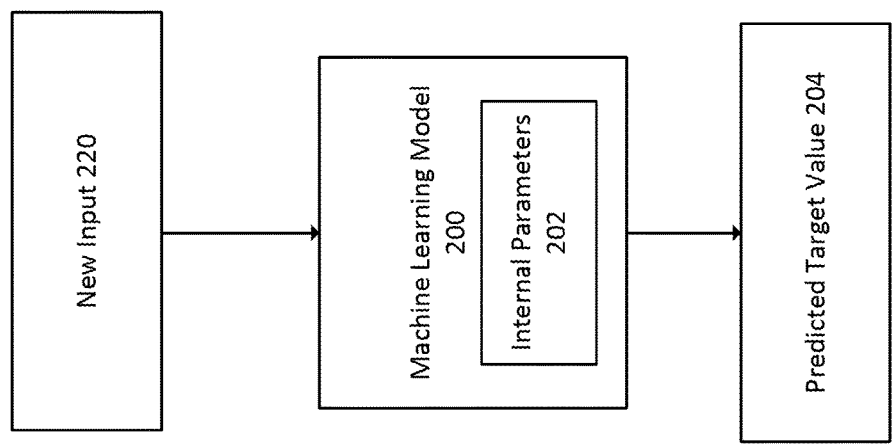
Figure 2A:
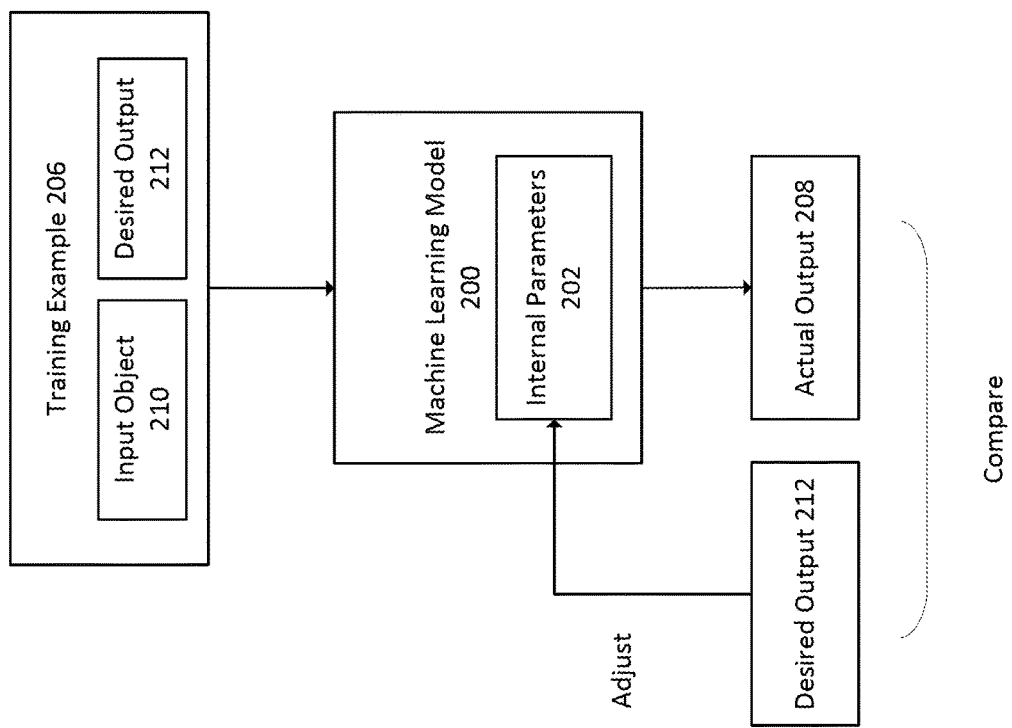

FIG. 2A illustrates an exemplary machine learning model 200. A machine learning model 200 may be a component, module, computer program, system, or algorithm. Some embodiments herein use machine learning for code completion, predictive editing, or predictive navigation. Machine learning model 200 may be used as the model to power those embodiments described herein. In some embodiments, machine learning model 200 uses supervised learning. In such an embodiment, machine learning model 200 is trained with training examples 206, which may comprise an input object 210 and a desired output value 212. The input object 210 and desired object value 212 may be tensors. A tensor is a matrix of n dimensions where n may be any of 0 (a constant), 1 (an array), 2 (a 2D matrix), 3, 4, or more.

The machine learning model 200 has internal parameters that determine its decision boundary and that determine the output that the machine learning model 200 produces. After each training iteration, comprising inputting the input object 210 of a training example in to the machine learning model 200, the actual output 208 of the machine learning model 200 for the input object 210 is compared to the desired output value 212. One or more internal parameters 202 of the machine learning model 200 may be adjusted such that, upon running the machine learning model 200 with the new parameters, the produced output 208 will be closer to the desired output value 212. If the produced output 208 was already identical to the desired output value 212, then the internal parameters 202 of the machine learning model 200 may be adjusted to reinforce and strengthen those parameters that caused the correct output and reduce and weaken parameters that tended to move away from the correct output.

The machine learning model 200 output may be, for example, a numerical value in the case of regression or an identifier of a category in the case of classifier. A machine learning model trained to perform regression may be referred to as a regression model and a machine learning model trained to perform classification may be referred to as a classifier. The aspects of the input object that may be considered by the machine learning model 200 in making its decision may be referred to as features.

After machine learning model 200 has been trained, a new, unseen input object 220 may be provided as input to the model 200. The machine learning model 200 then produces an output representing a predicted target value 204 for the new input object 220, based on its internal parameters 202 learned from training.

Machine learning model 200 may be, for example, a neural network, support vector machine (SVM), Bayesian network, logistic regression, logistic classification, decision tree, ensemble classifier, or other machine learning model. Machine learning model 200 may be supervised or unsupervised. In the unsupervised case, the machine learning model 200 may identify patterns in the unstructured data 240 without training examples 206. Unstructured data 240 is, for example, raw data upon which inference processes are desired to be performed. An unsupervised machine learning model may generate output 242 that comprises data identifying structure or patterns.

A neural network may be comprised of a plurality of neural network nodes, where each node includes input values, a set of weights, and an activation function. The neural network node may calculate the activation function on the input values to produce an output value. The activation function may be a non-linear function computed on the weighted sum of the input values plus an optional constant. In some embodiments, the activation function is logistic, sigmoid, or a hyperbolic tangent function. Neural network nodes may be connected to each other such that the output of one node is the input of another node. Moreover, neural network nodes may be organized into layers, each layer comprising one or more nodes. An input layer may comprise the inputs to the neural network and an output layer may comprise the output of the neural network. A neural network may be trained and update its internal parameters, which comprise the weights of each neural network node, by using backpropagation.

A convolutional neural network (CNN) may be used in some embodiments and is one kind of neural network and machine learning model. A convolutional neural network may include one or more convolutional filters, also known as kernels, that operate on the outputs of the neural network layer that precede it and produce an output to be consumed by the neural network layer subsequent to it. A convolutional filter may have a window in which it operates. The window may be spatially local. A node of the preceding layer may be connected to a node in the current layer if the node of the preceding layer is within the window. If it is not within the window, then it is not connected. A convolutional neural network is one kind of locally connected neural network, which is a neural network where neural network nodes are connected to nodes of a preceding layer that are within a spatially local area. Moreover, a convolutional neural network is one kind of sparsely connected neural network, which is a neural network where most of the nodes of each hidden layer are connected to fewer than half of the nodes in the subsequent layer.

A recurrent neural network (RNN) may be used in some embodiments and is one kind of neural network and machine learning model. A recurrent neural network includes at least one back loop, where the output of at least one neural network node is input into a neural network node of a prior layer. The recurrent neural network maintains state between iterations, such as in the form of a tensor. The state is updated at each iteration, and the state tensor is passed as input to the recurrent neural network at the new iteration.

In some embodiments, the recurrent neural network is a long short-term (LSTM) memory neural network. In some embodiments, the recurrent neural network is a bi-directional LSTM neural network.

A feed forward neural network is another type of a neural network and has no back loops. In some embodiments, a feed forward neural network may be densely connected, meaning that most of the neural network nodes in each layer are connected to most of the neural network nodes in the subsequent layer. In some embodiments, the feed forward neural network is a fully-connected neural network, where each of the neural network nodes is connected to each neural network node in the subsequent layer.

A gated graph sequence neural network (GGSNN) is a type of neural network that may be used in some embodiments. In a GGSNN, the input data is a graph, comprising nodes and edges between the nodes, and the neural network outputs a graph. The graph may be directed or undirected. A propagation step is performed to compute node representations for each node, where node representations may be based on features of the node. An output model maps from node representations and corresponding labels to an output for each node. The output model is defined per node and is a differentiable function that maps to an output.

Neural networks of different types or the same type may be linked together into a sequential or parallel series of neural networks, where subsequent neural networks accept as input the output of one or more preceding neural networks. The combination of multiple neural networks may comprise a single neural network and may be trained from end-to-end using backpropagation from the last neural network through the first neural network.

Figure 2B:
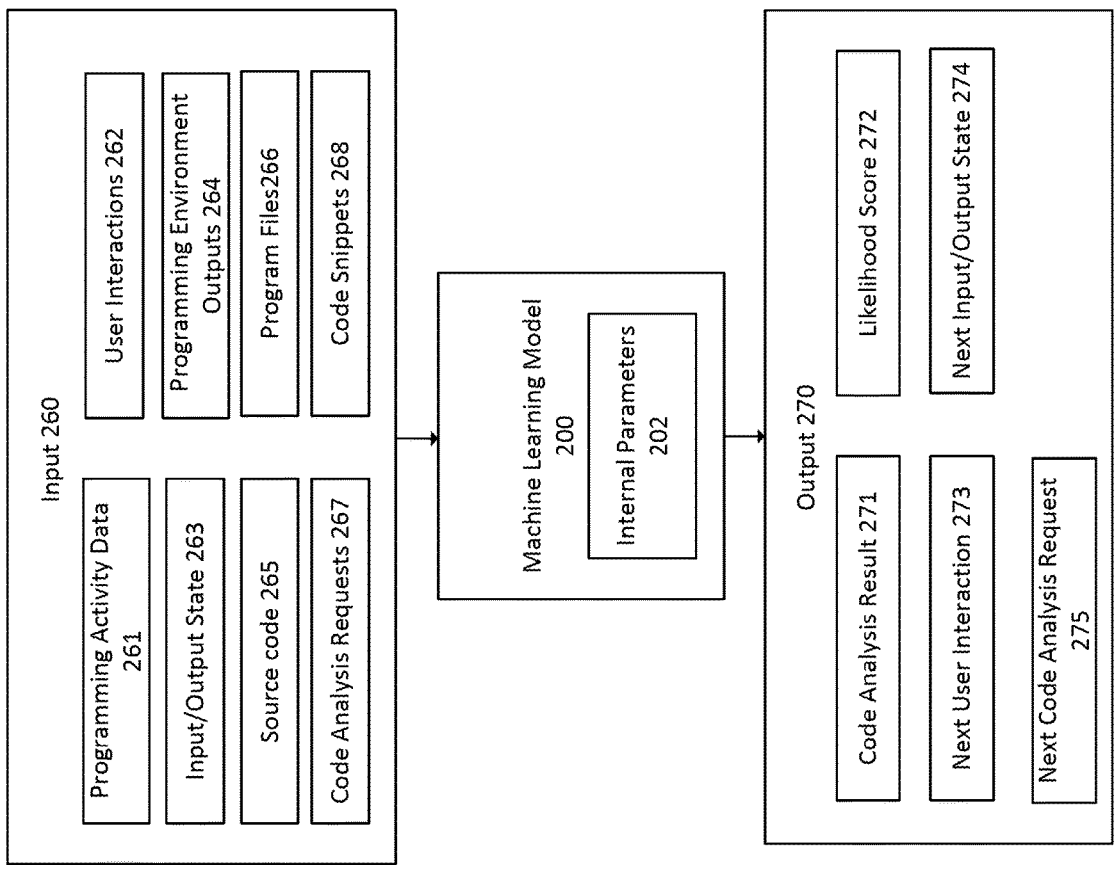
FIG. 2B illustrates an exemplary use of a machine learning model.

FIG. 2B illustrates use of the machine learning model 200 to perform inference on input 260 comprising data relevant to a programming co-pilot system 340. Input 260 may comprise any of programming activity data 261, user interactions 262, input/output state 263, programming environment outputs 264, source code 265, or program files 266, code analysis requests 267, code snippets 268, or other data. In some embodiments, input 260 may be provided as a sequence or time series. The machine learning model 200 performs inference on the data based on its internal parameters 202 that are learned through training. The machine learning model 200 generates an output 270 comprising information or data relevant to helping a programmer, such as code analysis result 271, a likelihood score 272 or a predicted next event such as a next user interaction 273, next input/output state 274, or next code analysis request 275.

Figure 3:
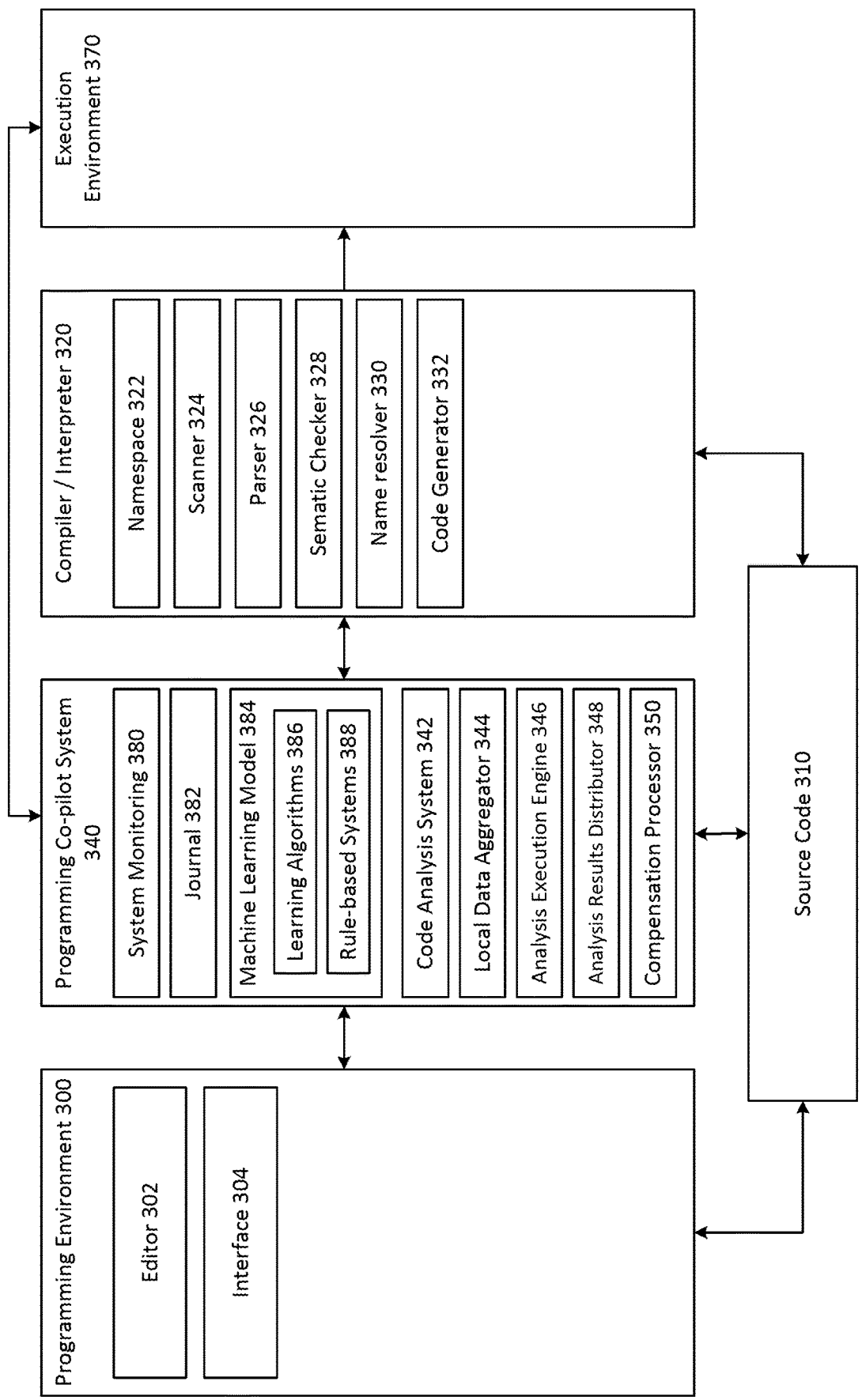
FIG. 3 illustrates an exemplary system for software development.

FIG. 3 illustrates an exemplary system for software development. Source code 310 may be provided and edited in a programming environment 300. The programming environment may allow interactive editing of the source code 310 by a user, such as a programmer. A programming environment may include an editor 302 and an interface 304. The editor 302 may provide for the developing, such as writing and editing, of source code 310. The interface 304 may present a human viewable or usable interface for using the editor 302. For example, the interface 304 may comprise a graphical user interface. Many different kinds of editor 302 may be used such as an integrated development environment (IDE), text editor, or command line. In some embodiments, an IDE such as Eclipse, Sublime, Atom, or Visual Studio may be used. In other embodiments, a shell or operating command line such as the Bash command line is used as a programming environment and may comprise an editor 302. In still other embodiments, single input interactive environments, such as Read-Eval-Print Loop (REPL), may be used as the editor 302. The programming environment may also include other computer applications on the system such as a web browser.

A compiler or interpreter 320 may compile the code 310 into executable instructions or an intermediate representation, or interpret the source code 310 for execution. The compiler/interpreter 320 may comprise a namespace 322 that can be used to store symbols, such as identifiers and types, and to allow for name resolution 330. In some embodiments, the compiler/interpreter 320 may comprise a scanner 324, parser 326, semantic checker 328, name resolver 330, and code generator 332. Scanner 324 may accept as input the source code 310 and split expressions and language statements into tokens that can be processed by the parser 326 to determine the grammatical structure of a program. A token may be a single element of a programming language such as a constant, identifier, operator, separator, reserved word, or other element. In some embodiments, a token is atomic and is the smallest semantic unit of a programming language, such that the token cannot be broken down further into units with semantic meaning in the language. The parser 326 may parse the tokens and organize them according to a grammar of a programming language. In some embodiments, parser 326 builds a parse tree. Semantic checker 328 may perform semantic checking of a computer program and may identify and throw errors that are semantic in nature. The name resolver 330 may resolve names in the parse tree to elements of the namespace 322. Code generator 332 may translate the parse tree, or other intermediate representation of the source code, into a target language. The target language may be executable instructions, such as a binary executable, or an intermediate language that may be interpreted for execution. In an execution environment 370, code may be executed, such as for testing or production.

Programming co-pilot system 340 may interact with the programming environment 300, source code 310, compiler/interpreter 320, and execution environment 370 to provide programming assistance to the programmer. Programming co-pilot 340 may include a monitoring system 380 to monitor user actions in an editor 302 and system events such as inputs, outputs, and errors. Programming co-pilot 340 may also include a journal 382, which may comprise a digital record of the history of data, such as sequential changes to and versions of source code, user interactions in the editor 302, user interactions in other parts of a system such as a terminal or web browser, system events, and other data. The journal 382 may record data sequentially so that a sequence of events may be exactly reconstructed. Programming co-pilot 340 may include functionalities such as code analysis system 342, local data aggregator 344, analysis execution engine 346, analysis results distributor 348, compensation processor 350.

Programming co-pilot 340 may include machine learning model 384 to power its functionality, including learning algorithms 386 that learn from data or rule-based systems 388 that use hard-coded rules or heuristics. Although illustrated as one unit, multiple machine learning models 384 may be used in practice to perform or implement different functionality. For example, each function may have a separate machine learning model. Programming co-pilot system 340 may interface with the programming environment 300 through API calls, data streams, inter-process messages, shared data structures, or other methods. In some embodiments, the programming co-pilot 340 is a separate program from the programming environment 300. In other embodiments, the programming co-pilot is a sub-program or component of the programming environment 300.

In some embodiments, the programming co-pilot may be distributed across multiple computers on a network. For example, local data aggregator 344 may run on a local computer such as client 157 while analysis execution engine 346 may run on one or more remote computers. The remote computers may comprise computers connected to the local computer by a remote network such as servers 120 or computers connected by a local network such as servers 156.

An embodiment of a programming co-pilot system 340 and its various functionality will be described herein. The programming co-pilot system 340 may include various combinations of the features described herein. In some embodiments, it includes all the functionalities described herein, and, in other embodiments, it includes only a subset of the functionalities described.

Embodiments may operate on any kind of source code including imperative programming languages, declarative code, markup languages, scripting languages . . . and other code. For example, source code may be Python, Perl, PHP, Javascript, Java, C, C++, HTML, reStructuredText, Markdown, CSS, shell scripts (such as bash, zsh, etc.), and so on.

A. Code Analysis System

In an embodiment, programming co-pilot system 340 includes a code analysis system 342. The code analysis system may perform code analysis by allocating tasks to one or more compute resources such as computers, servers, processors, nodes, or other resources. Code analysis may comprise any analysis of programming activity data which creates output to help a user, such as a programmer, program more effectively or efficiently. For example, code analysis may comprise applying a calculation, transformation, procedure, or algorithm to programming activity data. Programming activity data includes not just code, but any data related to programming activity such as the log output of a program, events, network requests, and so on. Code analysis includes analysis of any kind of programming activity data and not just analysis of code. In an embodiment, code analysis may comprise static analysis, dynamic analysis, type analysis, error detection, error prediction, error classification, fix detection, fix prediction, auto-completion, edit prediction, auto-navigation, documentation checking, documentation generation, or other analysis. In some embodiments, code analysis may comprise multiple steps or stages of analysis. For example, code analysis may comprise a first training step of training a machine learning model using past programming activity data and a second inference step of applying the machine learning model to new programming activity data.

Programming activity data may comprise any data generated during programming, such as user interactions, input/output state, programming environment outputs, program files, or other data. User interactions may comprise clicks, key presses, file opens, cursor positions, selection ranges, click actions, select actions, edit actions, tab switches, searches or queries, or other user interactions. In an embodiment, user interactions may be recorded as a time series. Input/output state may comprise input or output values from a terminal or console, a web browser, an emulator, an integrated development environment, or another input/output channel. Input/output state may be captured as a time series. Programming environment outputs may comprise program return values, compile-time errors, run-time errors, error messages, current directory, environmental variable values, stack traces, heap dumps, or other programming environment outputs. The current directory may comprise a current working directory in a terminal, a directory containing the current file, or so on. Program files may comprise source code, documentation, executable files, configuration files, make files, scripts, or other files.

In some embodiments, programming activity data may be private to the user. In some embodiments, programming activity data may include public or semi-public data. For example, public programming activity data might include open-source code or error messages posted to a crowd-sourced question and answer website. Semi-public data might include programming activity data stored in a company database or posted in an organization-specific forum.

The compute resources which the code analysis system 342 may allocate tasks to may be local to the computer of the user or remote over a network. In some embodiments, the code analysis system 342 may be distributed over multiple computers on a network.

Figure 4:
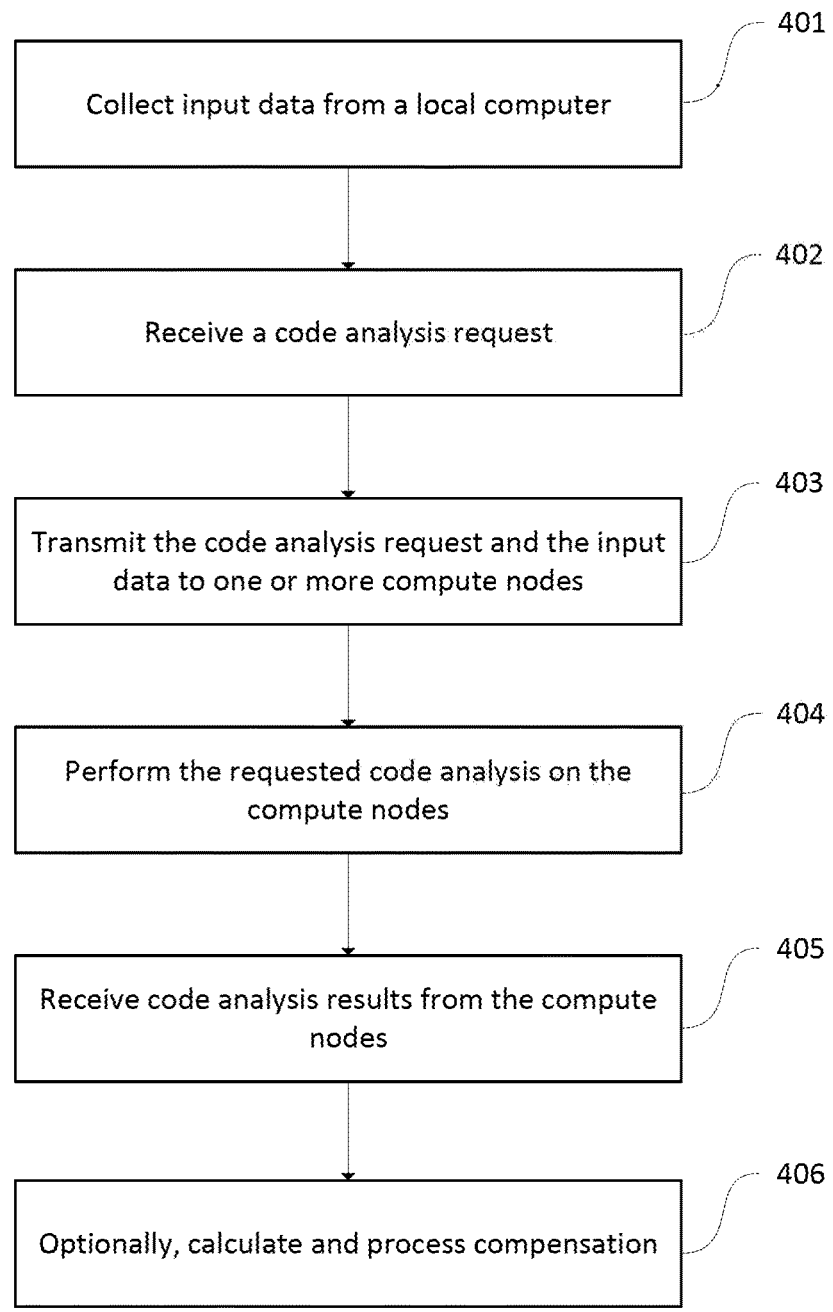
FIG. 4 illustrates an exemplary method of implementing code analysis.

FIG. 4 illustrates an exemplary method 400 for implementing code analysis. In step 401, a plurality of input data is collected from a local computer. The input data may comprise programming activity data. In an embodiment, step 401 may be performed by a local data aggregator 344 which implements method 500. In step 402, a code analysis request is received. In step 403, in response to receiving the code analysis request, the request and the input data are transmitted to one or more compute nodes. The compute nodes may comprise one or more local or remote computers, servers, processors, nodes, or other computing resources. In an embodiment, the compute nodes may comprise an analysis execution engine 346. In step 404, the requested code analysis is performed by the compute nodes using the input data. In an embodiment, the analysis may be performed by the analysis execution engine 346 performing method 600. In step 405, code analysis results are received from the compute nodes. The code analysis results may comprise an answer to or result of the code analysis request. For example, the code analysis results may comprise an index built to help locate data from codebases, metadata or tags such as type annotations, predictions of future activity, machine learning models which perform inference on programming activity data, or other results of code analysis. In an embodiment, the code analysis results may be collected and returned by an analysis results distributor 348 performing method 700. In step 406, optionally, compensation may be calculated and processed. In an embodiment, compensation may be calculated and processed by a compensation processor 350 performing method 800.

In one variation, a code analysis system 342 may perform analysis locally on a local computer but also send a carbon copy of the user's data, such as from monitoring of the user's programming, to remote nodes comprising an analysis execution engine 346. The owner of the remote nodes may benefit from the additional data, while the user may receive compensation in various ways such as being paid money or receiving access to additional features. In this embodiment, the compute nodes may comprise the local computer such that all computation may be performed on the local computer, and a copy of the input data may be transmitted to a remote server or database. The remote server may, for example, use the copy of the input data for development, testing, or debugging of the code analysis system 342. The user may receive compensation in the form of money, access to software or software features, or additional services requiring external access to the input data. For example, additional services may comprise a programmer skill rating which compares programming skill of the user to programming skill of other users using input data from each user. The code analysis system 342 may calculate programmer skill based on the data received from one or more users and may base the calculation on a variety of features such as coding history, number of commits, amount of code committed, amount of code written or edited, number of errors during compilation or execution, speed at fixing bugs, number of bugs fixed, and so on. In another example, additional services may comprise synchronization of a plurality of instances of the code analysis system 342 across computers for the same user. When the user uses the code analysis system 342 on a new computer, the remote server may be used to seed a copy of the history of programming activity data of the user.

In another variation, the co-pilot 340 may allow for some code analysis to occur on a local computer and for other code analysis to occur remotely. In some embodiments, the user may be given the option between local or remote processing. In some embodiments, a user interface may be provided which allows the user to select a set of compute nodes to use, some of which may comprise the local computer and others of which may be remote computers. One or more sets of compute nodes may be provided with varying levels of computing performance. Computing performance may comprise attributes such as CPU speed, RAM, hard-drive storage, network speed, or other attributes. The quality of code analysis results produced by code analysis system 342, or the speed at which results are produced, may correspond to the level of computing performance of the selected compute nodes. Relative quality of code analysis results for each set of compute nodes may be indicated to the user, and a set of compute nodes may be chosen based on preferences of the user. For example, the user may choose local computation with lower quality due to not wanting to share programming activity data. In another example, the user may choose local computation due to slow internet connection or lack of internet connection. In an embodiment, one set of compute nodes may comprise the local machine of the user and other compute nodes may comprise remote servers.

In another variation, the results of code analysis performed on global or community data may be applied to code of the user, even if the code of the user was not used to produce the results. In some embodiments, this may apply to machine learning models, which may be trained on general datasets and then applied to the user's code. For example, the requested code analysis may be performed using one or more machine learning models which are trained using global, public, or past data, where the data that was trained on does not include the input data. That is, the input data is previously unseen data for the machine learning models. In an embodiment, the machine learning models may be trained using data which do not include any data provided by the user. For example, a function classifier comprising a machine learning model may be trained to analyze a function based on the name of the function, code inside the function definition, or calls to the function in the code base. In some embodiments, the function classifier is trained only on public, open-source code. To perform a requested code analysis, the function classifier may be applied to a new, previously unseen function in the input data to produce code analysis results.

In another variation, machine learning models may be trained on remote nodes and then downloaded for use on a local computer. For example, in some embodiments, code analysis system 342 includes an offline component where code analysis is performed for the purpose of generating results that are stored for later use. Inputs to the offline component may include, for example, user requests for analysis, data provided manually by a network administrator, or data scraped from web sources, such as open source code. In one exemplary application, one or more machine learning models are trained offline by code analysis system 342. The trained machine learning models may be stored in a database. Code analysis performed by the compute nodes may comprise retrieval of an appropriate machine learning model and applying the appropriate machine learning model to the input data. In an embodiment, offline training may be performed by remote servers to generate machine learning models on the remote servers. The training may be performed using global or public data from other users. The appropriate machine learning model may be downloaded and applied by the local computer to data on the local computer. Offline training or updating of machine learning models may occur on a regular interval, based on availability of computing resources, or based on triggering events such as release of new software or update of software versions.

In some embodiments, the code analysis system 342 may save a full or partial history of the input data. The history of the input data may be saved on the local computer, on a remote computer, or on a plurality of remote computers. The remote computer or computers may be owned or controlled by the user, an organization affiliated with the user, or a third party. In an embodiment, the history of the input data may be saved in journal 382.

B. Local Data Aggregator

In an embodiment, programming co-pilot system 340 includes a local data aggregator 344. The local data aggregator 344 may collect a plurality of local data comprising programming activity data from a local computer and package the local data for transmission.

Figure 5:
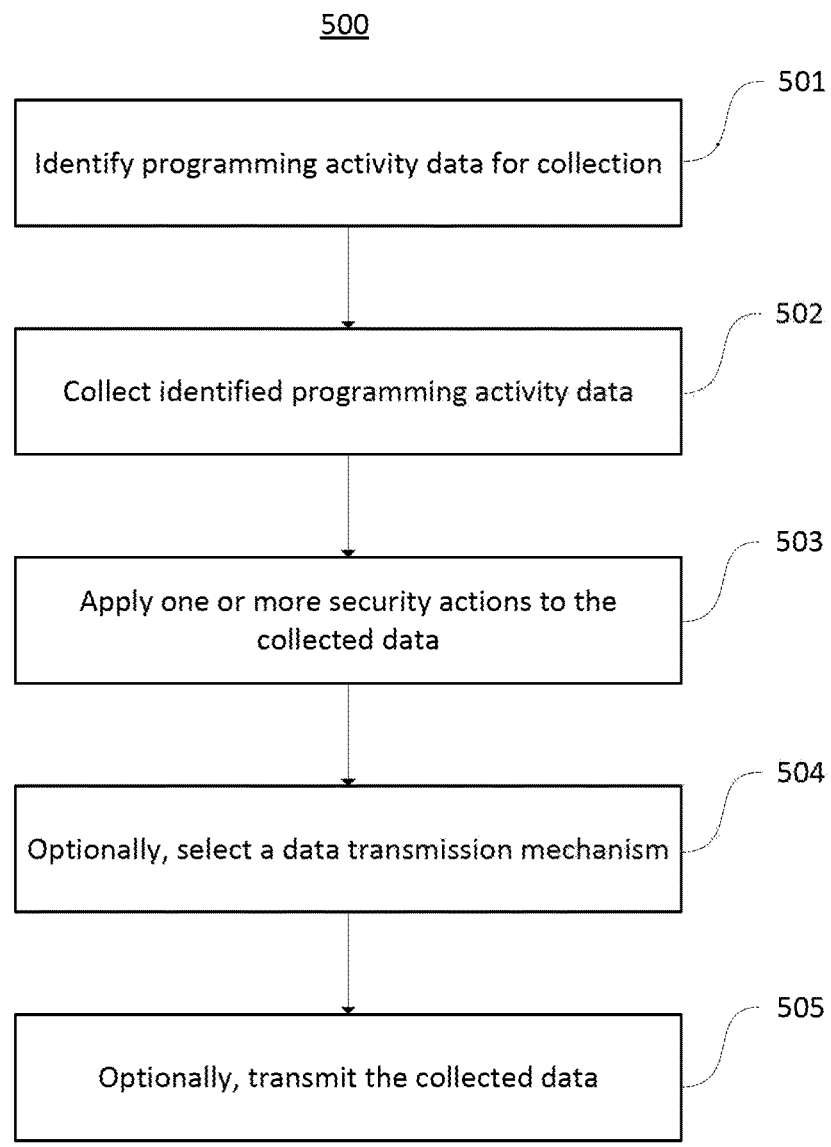
FIG. 5 illustrates an exemplary method of implementing local data collection.

FIG. 5 illustrates an exemplary method 500 of implementing local data collection. In step 501, programming activity data from a local computer is identified for collection. In some embodiments, all programming activity data accessible by the local data aggregator 344 may be identified for collection. The local data aggregator may access programming activity data by scanning or listening for changes to directories, processes, applications, operating system resources, or other components of the local computer. In some embodiments, at least a portion of the programming activity data may be identified for collection by user settings or default values. The system may present to the user configuration options allowing selection of data sources or event types for monitoring and transmission to the one or more remote nodes. For example, the co-pilot system 340 may include a user-modifiable setting which identifies a directory of files for collection. In another example, the co-pilot system 340 may include a use-modifiable setting that identifies output of a program such as an IDE for data collection. In another example, a default setting may identify all console output for collection. In some embodiments, the local data aggregator may suggest data to be collected and may prompt the user to accept or decline the suggestion. Suggested data accepted by the user may be identified for collection. Suggestions may be generated based on data known to be required for code analysis.

In step 502, the programming activity data identified for collection is collected from the local computer. In some embodiments, programming activity data may be collected through software such as applications, plug-ins, browser extensions, APIs, or other software. For example, program files such as source code may be collected by an application which searches the hard drive of the local computer to discover source code files and directory structure. The search may occur regularly or may be triggered by file system events. In another example, user interactions in an editor may be collected by an editor plugin. In another example, user interactions in a terminal or console window may be collected by using operating system APIs or using a wrapper plugin that mimics the REPL of the terminal. In another example, a browser extension or an emulator software customization may be used to collect input/output state from a browser or an emulator. Programming activity data collected through the software may include source code, recorded actions in an editor, recorded actions in a terminal, recorded actions in a web browser, recorded actions in an emulator, and so on. The recorded actions may be temporarily or permanently stored.

In some embodiments, collection of data may be optimized to minimize the volume of data which may be transmitted. In one embodiment, program files may only be collected when the program files have changed. The computer system may listen for a system event to determine when a program file has changed. For example, program files may be collected only in response to a file system event indicating a change has occurred in the file. In another example, a local cache may be maintained which tracks program files which have already been collected and transmitted. The local cache may store the versions of the program files that were transmitted to remote nodes. Afterward, program files may only be collected and transmitted when their content differs from that in the local cache. The local cache may be synced on a fixed or varying interval by querying one or more remote servers which receive collected data. In another example, a program file diff comprising only the changes to a program file may be collected and transmitted instead of the full text of the file. By transmitting only the differences, the remote nodes may recreate the up to date version of the file by applying the differences to a base version of the file. Moreover, a diff may be used for transmission of any form of programming activity data, not just source code. For example, a diff may be used with logs, inputs and outputs, or other data. A diff may be computed between a first version of data and a second version of data, where the second version of data was earlier in time. The computed diff shows the differences between the first and second versions of the data. The local computer may then transmit the result of the diff to one or more remote nodes, without transmitting the entire first version of data. The remote nodes may then update their data based on the diff so that the remote nodes and local computer have the same version of the data.

In another embodiment, user interactions in an editor may be collected selectively to avoid collection of low-information user interactions. For example, time-based rules may be used to ignore a portion of user interactions which occur in quick succession, such as a plurality of clicks or keystrokes generated by a user scrolling to the end of a file. Within a time range, only a subset of user interactions which occur may be collected. In some embodiments, the subset may comprise the first and last user interaction within the time range. In some embodiments, the user interactions or other events that occur within the time range may be collected but are discarded from processing or code analysis. The beginning event and ending event of the time range may optionally be retained. The time range or selection of the subset may be set by user defined values, default values, or rules-based heuristics. In another example, a machine learning model may be trained which takes in a sequence of user interactions from the editor and outputs a probability that each user interaction in the sequence is important. User interactions above a threshold probability may be collected.

In another embodiment, user interactions or input/output state in a terminal may be collected selectively to avoid collection of low-information user interactions. For example, rules-based heuristics may be used to avoid collecting common terminal commands which are unlikely to be associated with programming. For example, in some embodiments, plain terminal commands with no additional specified arguments or flags may not be collected because the commands are unlikely to provide information about the user's programming intent. As an example, in one embodiment, 'ls'/list file commands without additional flags or parameters may not be collected. In another example, a machine learning model may be trained which takes in a sequence of user interactions or input/output state from the terminal and outputs a probability that each user interaction or input/output state in the sequence is important. User interactions or input/output state above a threshold probability may be collected.

In step 503, one or more security actions may be applied to collected data comprising programming activity data collected in step 502. In an example, the security actions may comprise application of permissions flags which control later use of the collected data. In another example, the security actions may comprise removal or modification of zero or more pieces of the collected data to protect sensitive information.

In an embodiment, one security action may comprise application of a permissions flag controlling later use of the data. The security action may be set to apply the permissions flag to some or all of the collected data. In an example, the security action may apply a permission flag allowing use of the collected data in code analysis requested by only the user, a subset of other users, or all other users. In another example, the security action may apply a permission flag allowing viewing of the collected data by only the user, a subset of other users, or all other users. In another example, the security action may apply a permission flag disallowing all use of the collected data and instructing deletion of any copies of the collected data upon receipt.

In an embodiment, one security action may comprise filtration of the collected data by a list of types of programming activity data. In one example, programming activity data of types on the list of types may be removed from the collected data. In another example, programming activity data of types not on the list of types may be removed from the collected data. The list of types may be set by the user or set by default values. In some cases, the list of types may be set by a user using an opt-in interface, wherein only types of programming activity data specified by the user are included in the list. Type of programming activity data may be, for example, user interactions, input/output state, programming environment outputs, program files, or other types described herein.

In an embodiment, one security action may comprise filtration of the collected data by a list of restricted character sequences. A restricted character sequence may comprise a sequence of text characters that is associated with private data. In one example, collected data containing any restricted character sequence may be removed. Files or lines of input containing the sequence 'password' may be removed. In another example, collected data containing any restricted character sequence may be modified by removing the restricted character sequence or replacing the restricted character sequence with a different character sequence. In an embodiment, character sequences such as a company name, project name, or client name may be removed or replaced.

In an embodiment, one security action may comprise application of an encryption mechanism to ensure that malicious third parties cannot observe the data during transmission. For example, public key or private key encryption may be applied. In another embodiment, one security action may comprise application of data obfuscation or data masking to disguise or replace sensitive information. The local computer may encrypt programming activity data and other information prior to transmission to remote nodes.

In step 504, optionally, a data transmission mechanism may be selected. The data transmission mechanism may comprise a public network, a private network, or secure, private connection over a public network such as a VPN. The data transmission mechanism may be selected by a default value, a user-defined value, or a rules-based heuristics.

In step 505, optionally, the collected data may be transmitted to one or more remote computers. The transmission of collected data may occur at a fixed interval, in response to a trigger, or based on rules-based heuristics.

C. Code Analysis Execution

In an embodiment, programming co-pilot system 340 includes an analysis execution engine 346. The analysis execution engine 346 may execute or manage execution of a received code analysis request on one or more input data. The code analysis request may be split by the analysis execution engine 346 into one or more analysis tasks. The analysis tasks may be assigned by the analysis execution engine 346 to one or more compute resources such as computers, servers, processors, nodes, or other resources. In some embodiments, the input data may comprise data received from local data collector 344 performing method 500. In some embodiments, the input data may be data which is publicly available, saved in a private or shared database, saved in a private, individual, or publicly-accessible codebase, pre-calculated and cached, or available through another mechanism. In some embodiments, analysis execution engine 346 may comprise a software program running on a local machine of a user. In other embodiments, analysis execution engine 346 may comprise a remote computer connected to the local machine. In still other embodiments, analysis execution engine 346 may comprise a distributed computer system of multiple computers connected to the local machine. In an embodiment, the distributed computer system may include the local machine.

Figure 6A:
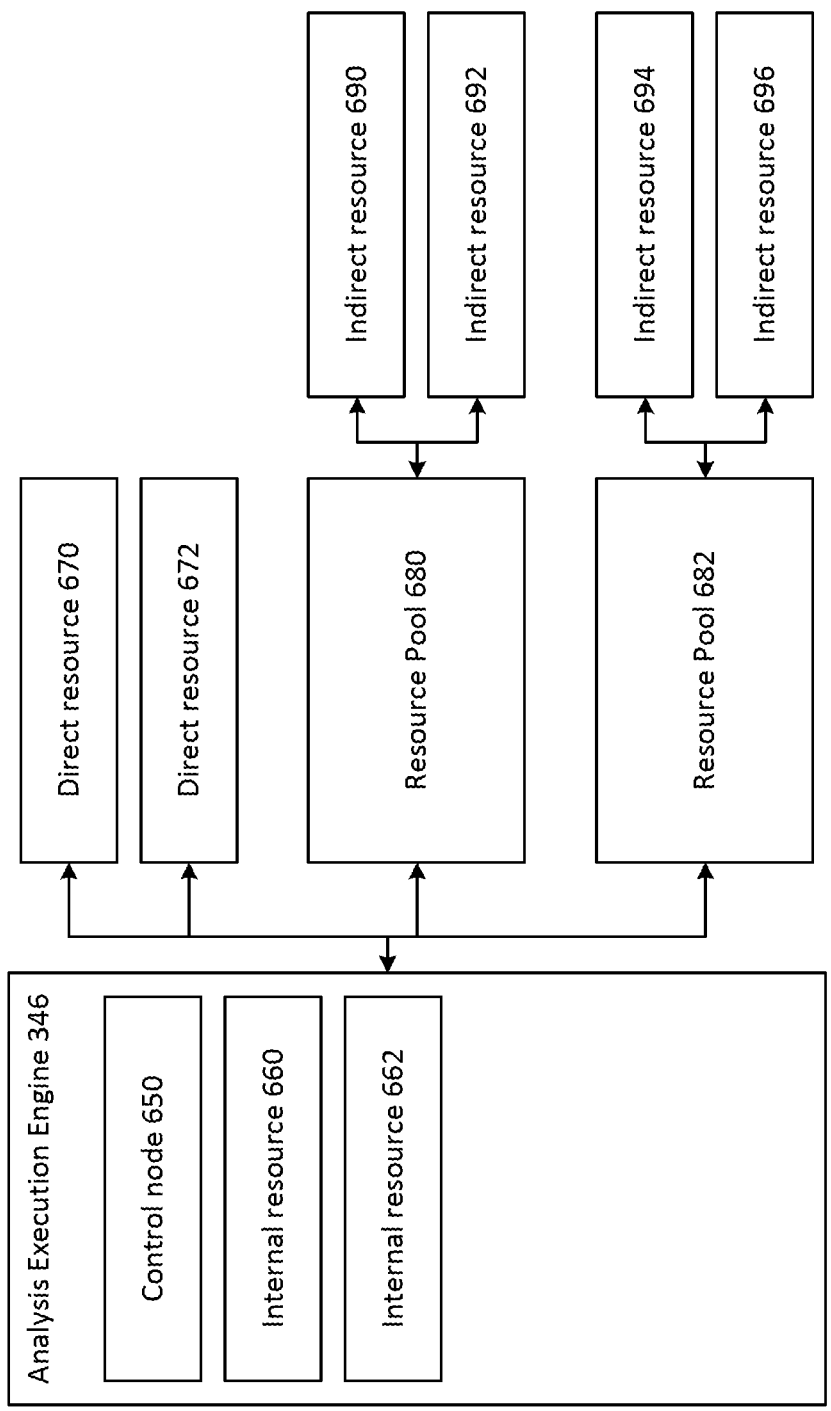
FIG. 6A illustrates an exemplary system and network environment that may be used in an embodiment.

FIG. 6A illustrates an exemplary system and network environment that may be used in an embodiment of analysis execution engine 346. Analysis execution engine 346 may include one or more control nodes 650 and one or more internal resources 660, 662. The control node 650 may comprise a thread, a software program, a computer, or a server responsible for directing operation of the analysis execution engine 346. The internal resources 660, 662 may comprise compute resources internal to analysis execution engine 346. In an example, the internal resources 660, 662 may comprise a CPU or GPU when the analysis execution engine 346 comprises a local or remote computer. In another example, the internal resources 660, 662 may comprise a component computer or server when the analysis execution engine 346 comprises a distributed computer system. In some embodiments, analysis execution engine 346 may additionally be connected to a network 140 or local network 150.

Analysis execution engine 346 may be connected to one or more direct resources 670, 672. Direct resources 670, 672 may comprise processors, computers, servers, nodes, or other resources externally connected to analysis execution engine 346. Direct resources 670, 672 may be connected by a network, a fast-peripheral connection such as USB or Thunderbolt, or another connection. In an embodiment, direct resource 670 may be an external GPU (eGPU) connected by USB, and direct resource 672 may be a server on the same local area network as analysis execution engine 346.

Analysis execution engine 346 may be connected to one or more resource pools 680. Resource pools 680, 682 may comprise computer clusters, data centers, cloud computing systems, decentralized computer networks, or other distributed computer systems. Resource pools 680, 682 may be connected by a network, an API, or another connection. Resource pools 680, 682 may provide indirect resources 690, 692 in response to a request for compute resources. In an embodiment, resource pool 680 may comprise a public cloud computing platform such as Amazon EC2, Google Cloud Platform, or Microsoft Azure. Indirect resources 690, 692 may comprise virtual machines instances initialized on the public cloud. In another example, resource pool 680 may comprise a private cloud or datacenter controlled by the user or an organization affiliated with the user. Indirect resources 690, 692 may comprise a server allocated by the datacenter. In another example, resource pool 680 may comprise a decentralized computing network wherein network participants may individually provide access to the computers of each participant. Indirect resources 690, 692 may comprise participating computers designated by the decentralized computing network. In one embodiment, the decentralized computing network is a blockchain network or a smart contracts network.

In some embodiments, the connections to direct resources 670, 672, resource pools 680, 682, and indirect resources 690, 692 may change over time. For example, connected resources may disconnect, or new resources may be connected. Analysis execution engine 346 may monitor and adapt to varying connected compute resources.

Figure 6B:
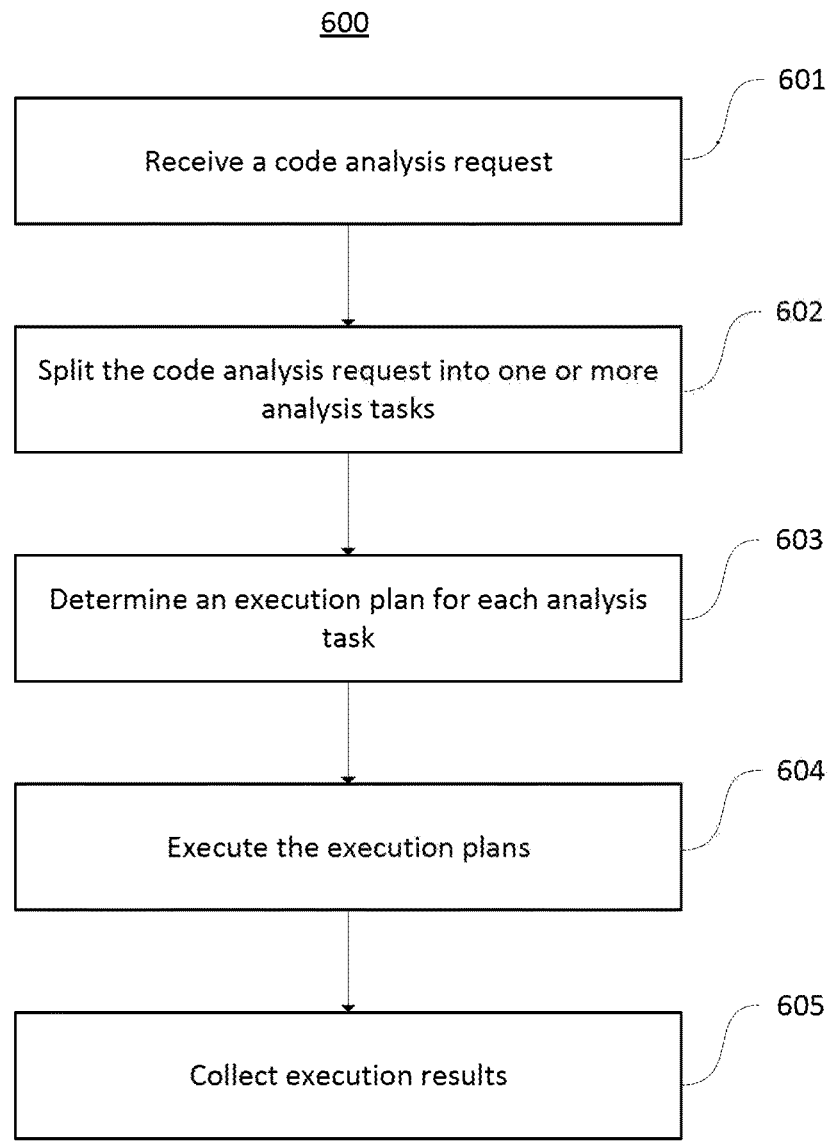
FIG. 6B illustrates an exemplary method of implementing code analysis execution.

FIG. 6B illustrates an exemplary method 600 of implementing code analysis execution. In step 601, a code analysis request is received. Optionally, input data associated with the request may also be received. The input data may comprise programming activity data. In an embodiment, the input data may be data collected by a local data collector 144 using method 500. The code analysis request and input data may be stored by the analysis execution engine 346 and other computer systems, such as internal resources, direct resources, and indirect resources.

In step 602, the code analysis request may be split into a set of analysis tasks, and each task may be associated with a set of analysis data. The analysis data may comprise programming activity data necessary to execute the task. In an embodiment, the analysis data may include at least a subset of the input data. In an embodiment, the analysis data may include programming activity data retrieved from a database or other source. For example, the analysis data may include source code from an open-source code repository or past user interactions from a programming activity data archive. In an embodiment, the code analysis request may be split into a set of analysis tasks using rules, heuristics, or templates. The rules, heuristics, or templates may be default values or set by the user. For example, the code analysis request may be associated with an execution template which defines the set of analysis tasks required. In an embodiment, the analysis data associated with each analysis task may be assigned using rules, heuristics, or templates. The rules, heuristics, or templates may be default values or set by the user. For example, one analysis task may comprise executing a function. A rule may determine what analysis data is necessary based on the function parameters. In some embodiments, step 602 may be performed by control node 650.

In step 603, an execution plan is determined for each analysis task. The execution plan may comprise assignment to a compute resource for execution. For example, an analysis task may be assigned to internal resource 660, direct resource 670, or indirect resource 690 for execution. In an embodiment, when an indirect resource 690 is selected, a resource request may first be submitted to resource pool 680 to initialize, allocate, or reserve indirect resource 690.

Alternatively, the execution plan may comprise retrieval of pre-computed or cached results from a database. In one embodiment, some code analysis results may be stored so that they can be returned or used in future queries. For example, in one example a code analysis request may be received that is identical to a prior code analysis request that has been processed. The results of the identical analysis task may be retrieved and returned. As another example, analysis tasks of code analysis requests on an open-source codebase may be cached, and they may be retrieved when a user requests the same code analysis on the open-source codebase. In another embodiment, code analysis results of a similar analysis task may be retrieved and used even when the tasks are not identical. For example, two users may have source code which are slightly modified branches of the same codebase. Results from a subset of analysis tasks executed for one user may be retrieved for the other user. For example, a machine learning model that is trained on one of the branches, as a result of a code analysis request, may be applied to perform inference on the other branch.

Assignment to a compute resource may be determined based on matching properties of the analysis task and properties of the compute resource. For example, tasks with high parallelism may be assigned to a resource with a GPU for faster processing. In another example, tasks with high memory requirements may be assigned to a server with a large amount of RAM. In another example, tasks with low requirements may be assigned to a small resource which may have lower cost. In some embodiments, assignment to a compute resource may be determined using additional factors such as overall system utilization. For example, if a plurality of tasks with high parallelism exist but only one resource with a GPU is available, some of the tasks with high parallelism may be assigned to resources without a GPU to reduce the bottleneck, increase overall utilization of resources, and complete the set of analysis tasks faster.

In some embodiments, one or more of the analysis tasks may depend on the results of a different analysis task, or one or more of the analysis tasks may comprise a plurality of steps or stages. The execution plan may contain instructions to wait for prior results before launching or contain instructions to execute later steps or stages on the same or different compute resource.

In some embodiments, step 603 may be performed by the control node 650. The control node 650 may additionally monitor analysis tasks for on-time completion, re-run tasks, or manage task failures. In some embodiments, a plurality of code analysis requests may be received concurrently. The plurality of requests may be received from a plurality of users. The control node 650 may additionally balance allocation of resources across the plurality of requests or the plurality of users. Balancing may occur based on number of servers, processor time, execution time, RAM utilization, network throughput, storage IOPS, or other metrics.

In other embodiments, steps 602 and 603 may be performed by the local computer. The local computer may determine a set of tasks to perform the requested code analysis and assign the set of tasks to a plurality of worker nodes.

In step 604, the execution plans are executed to generate execution results. For example, when the execution plan comprises assignment to a compute resource, the analysis task may be calculated by the compute resource. In another example, when the execution plan comprises retrieval of pre-computed results from a database, pre-compute results may be retrieved.

In step 605, results from execution of the analysis tasks may be collected. In some embodiments, the results may be combined, transformed, or otherwise processed to create an answer to the code analysis request. The created answer may comprise a code analysis result. In some embodiments, step 605 may be performed by the control node 650. In one embodiment, results collected in step 605 may be fed back into the system in step 601 and used for processing another code analysis request.

Internal resources 660, 662, direct resources 670, 672, and indirect resources 690, 692, 694, 696 may work together to perform the requested code analysis. For example, in an embodiment, a first worker node (which may comprise an internal resource, direct resource, or indirect resource) receives input data from the local computer and processes the input data to produce intermediate data. The intermediate data may then be transmitted to other worker nodes for further processing. In an embodiment, the intermediate data is transmitted from the first worker node to a second worker node. The second worker node processes the intermediate data to produce an analysis output that it transmits to the local computer.

D. Data Security and Privacy

In one embodiment, code analysis may be performed on other clients. The other clients may comprise the remote nodes in methods 600 and 700 for example. The input data for the code analysis may be encrypted with end-to-end encryption for security. In one embodiment, the local computer encrypts the input data, such as historical or current data, using a key. Other clients on the network have permission to access and obtain the encrypted data from the network. The other clients have a key for decrypting the data. The key may comprise a key in a private key encryption system, or may comprise a corresponding private key for decryption in a public-private key encryption system. The other clients decrypt the data using their keys and perform the code analysis such as described in steps 601-605. After completing the code analysis, the other clients may encrypt and transmit the data back to the network and the local computer.

In one embodiment, users may choose to delete their historical or time-series data stored on the remote nodes. For example, users may wish to remove their data from the network for security reasons. In an embodiment, a request to delete the historical or time-series data is received at the remote nodes from the local computer. Upon receiving the request, the remote nodes may delete the data. In one embodiment, the user may request deletion of the data for his or her team. The remote nodes may verify that the user has permissions to delete the data for his or her team. The remote nodes may then delete the data.

In one embodiment, the system may use differential privacy to determine when data may be shared without exposing confidential data. Moreover, differential privacy may be used to create summaries of data that may be transmitted without exposing confidential data or allowing confidential data to be derived. In one embodiment, the local computer uses differential privacy to analyze data related to a code analysis request and determine data that will not expose confidential data on the local computer when the data is transmitted to one or more remote nodes. The local computer may then transmit the data to the one or more remote nodes. In one embodiment, the remote nodes may use differential privacy to analyze data related to a code analysis request and determine data that will not expose confidential data on the local computer when the code analysis is performed on the data or when the data is shared from the remote nodes to other clients.

E. Resource Allocation

In one embodiment, the system provides for fan speed regulation for nodes performing the code analysis. The fan speed regulation may be performed on the local computer when the local computer is performing the code analysis or may be performed on remote nodes performing code analysis. Resources on the computer system, such as the CPU, may be throttled based on conditions on the computer system. The computer system may determine to use less CPU if it is determined that the CPU fan will turn on or an increase in rotations per minute (RPM) of a fan will result. Thus, rather than increasing the CPU load or keeping the CPU load the same, the computer system may determine to use less CPU in order to provide for less fan noise or less noise from fan RPM.

In an embodiment, the local computer or a remote node may distribute one or more tasks from the code analysis request to one or more remote nodes. The distribution of the tasks may be affected by the characteristics of the remote nodes available to do work. For example, code analysis requests may be routed to nodes based on geographic proximity or latency in order to return results as fast as possible. Requests may be routed preferably to remote nodes that are geographically close or that have low latency. When work is distributed among multiple remote nodes, the distribution of sub-tasks of the code analysis task may also be performed based on characteristics of the remote nodes, as described above.

In one embodiment, a code analysis task may be performed in part on one or more local computers and in part on remote nodes of the network. The results of local and remote computation may then be combined. The local computer may determine a way for dividing a code analysis task into one or more sub-tasks. One or more sub-tasks may be assigned for local processing, and one or more sub-tasks may be assigned for remote processing. The local computer may perform the sub-tasks for local processing and may transmit the sub-tasks for remote processing and receive the results. The local computer may then combine the results of local and remote processing. In one embodiment, some results may require large machine learning models and thus transmitted for processing on the remote nodes and other results may be related to local data and be computed locally. The large machine learning models may be stored on the remote nodes and applied to the received data. The remote nodes may return the results of processing to the local computer. The local computer may combine the data received from the remote nodes with data computed on the local computer.

In one embodiment, the system may offer weak and strong versions of a feature or machine learning model. A weak version of a machine learning model may be a smaller model and a strong version of the machine learning model may be a larger model. The weak feature or model may be computed on the local computer. Computation on the local computer may provide advantages for privacy or be optimal when the user does not have a fast Internet connection. The strong feature or model may be computed on the remote nodes on the network in order to take advantage of the greater computational resources.

F. Results Aggregation and Distribution

In an embodiment, programming co-pilot system 340 includes an analysis results distributor 348. The analysis results distributor 348 may select and return a result set to a user. The result set may comprise one or more code analysis results. In some embodiments, the result set may be selected from a database or archive of pre-computed code analysis results. In some embodiments, the analysis results distributor 348 may optionally compute one or more new code analysis results or request computation of one or more new code analysis result prior to selecting the result set. In an embodiment, a request for computation of the new code analysis result may be sent to analysis execution engine 346.

In some embodiments, the result set may be selected and returned in response to receiving a code analysis request. In some embodiments, the result set may be selected and returned in anticipation of one or more future code analysis requests, by prefetching, to reduce response time or avoid network delays. Code analysis requests may be prefetched prior to user requesting a code analysis. In other embodiments, the user may request a code analysis, and the system provides both the requested analysis and additional prefetched analyses. For example, the result set may comprise a first code analysis result for a current code analysis request and one or more conditional code analysis results for the anticipated future code analysis requests. In a further example, the anticipated future code analysis request may comprise the current code analysis request with an additional keystroke. The conditional code analysis results may comprise a second code analysis result to be used when the next keystroke is 'a', a third code analysis result to be used when the next keystroke is 'b' and so on. In an embodiment, analysis results distributor 348 may anticipate future code analysis requests using rules-based heuristics, statistical techniques, or a machine learning model 200. For example, the machine learning model may be trained to take in a sequence of code analysis requests as an input and output a set of likely future code analysis requests.

In some embodiments, a plurality of differing code analysis results may be valid responses to one code analysis request. In an embodiment, the differing code analysis results may be created using a multitude of analysis mechanisms or a multitude of input data sets. For example, a first code analysis request may be analyzed using a plurality of analysis mechanisms comprising different sets of rules-based heuristics or different machine learning models. In another example, a second code analysis request may be analyzed by applying an analysis mechanism to a plurality of input data sets such as an open-source code base, a single user code base, a plurality of related user code bases, or a combination of open-source and user code bases. In an embodiment, the differing code analysis results may each be associated with attributes such as file size, parallelism, computation time, network transfer time, cost, or other attributes. The analysis results distributor 348 may select one or more of the differing code analysis results using the attributes associated with each result.

Figure 7:
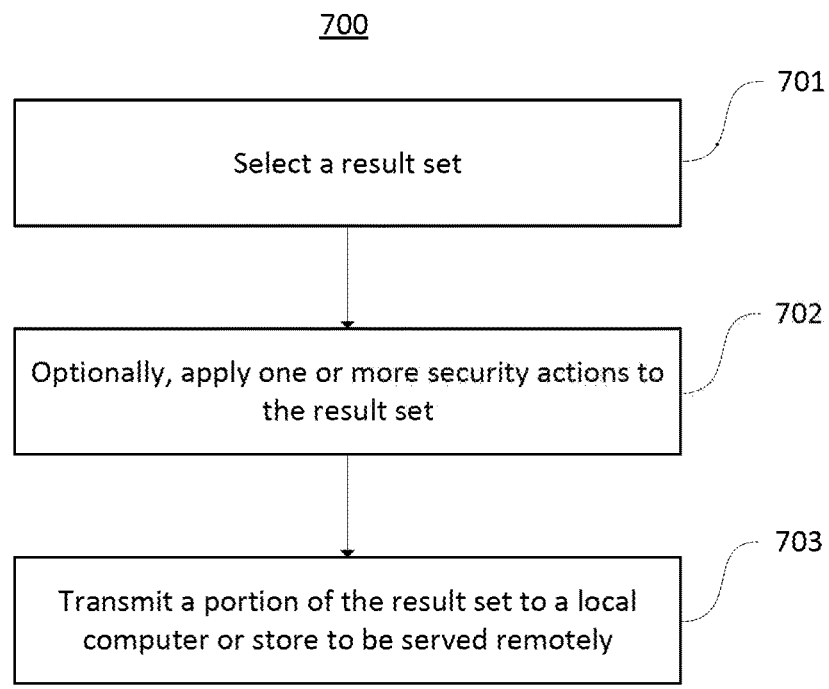
FIG. 7 illustrates an exemplary method of implementing analysis result distribution.

FIG. 7 illustrates an exemplary method 700 of implementing analysis result distribution. In step 701, a result set, comprising one or more code analysis results, is selected. The result set may be selected from one or more databases of code analysis results. In an embodiment, one or more of the databases may comprise cloud servers. In an embodiment, the databases may contain a plurality of code analysis results which were computed using different analysis mechanisms or different input data sets. In an embodiment, the databases may contain a plurality of code analysis results which were pre-computed and cached or lazily or just-in-time computed for selection. In an embodiment, the result set may be selected in response to a triggering event or in anticipation of a triggering event. The triggering event may comprise a code analysis request or another event.

In step 702, optionally, one or more security actions may be applied to the result set. The security actions may be applied selectively. For example, in some embodiments, security actions may not be applied to code analysis results in the result set which were generated based on only open-source or otherwise public input data. In an embodiment, one security action may comprise removing or anonymizing sensitive data such as account identifiers, passwords, keys, addresses, or other sensitive data. The security action may comprise application of rules-based heuristics or a machine learning model 200. In an example, a hard-coded rule may be applied such as removing all string literal values or replacing all string literal values with randomly generated strings. In another example, a machine learning model 200 may be trained to take in a code snippet such as a variable assignment as input and return a likelihood score that the code snippet contains sensitive data. Code snippets with likelihood score above a threshold value may be removed or replaced.

In an embodiment, one security action may comprise adding noise or randomness to disguise statistics in the result set. For example, cryptographic techniques such as differential privacy may be applied.

In an embodiment, one security action may comprise filtering code analysis results in the result set or contents of code analysis results in the result set based on frequency of use or frequency of appearance. Frequently used or frequently appearing strings, code, statistics, patterns, or other contents may be less likely to be sensitive or confidential. Code analysis results or contents below a threshold frequency of use or frequency of appearance may be removed.

In step 703, at least a portion of the result set may be transmitted to a local computer of the user or the result set may be stored in the remote network of nodes to be served remotely by the network to the local computer and other computers. The result set may be transmitted over a public network, a private network, a private connection over a public network such as a VPN, or another communication channel. The result set may be transmitted by one or more servers. One or more of the servers may comprise cloud servers. Since results may not necessarily be needed right away, in some embodiments the servers store the result set to be available to serve the result set, or a portion thereof, upon request by the local computer or other computers in the future.

In some embodiments, a set of servers may be selected to transmit the result set. In an embodiment, the set of servers may be selected to minimize network latency to the local computer. In an embodiment, the set of servers may be selected to ensure transmission time is below a threshold such as 100 milliseconds. In an embodiment, the set of servers may be selected based on attributes of the code analysis results in the result set such as file size.

In some embodiments, at least a portion of the result set may be transmitted in a delayed manner to reduce network bandwidth use. For example, a large index in a code analysis result in the result set may be split into a plurality of file parts and the parts may be transmitted over time, on-demand, or as-needed.

G. Compensation Mechanisms

In an embodiment, programming co-pilot system 340 includes a compensation processor 350. The compensation processor 350 may calculate and process one or more payments related to using or exchanging computation or data during code analysis. For example, the user may provide compensation for use of software or compute resources, such as remote nodes, for processing a code analysis request. In another example, compensation may be provided to the user for sharing of data belonging to the user.

Figure 8:
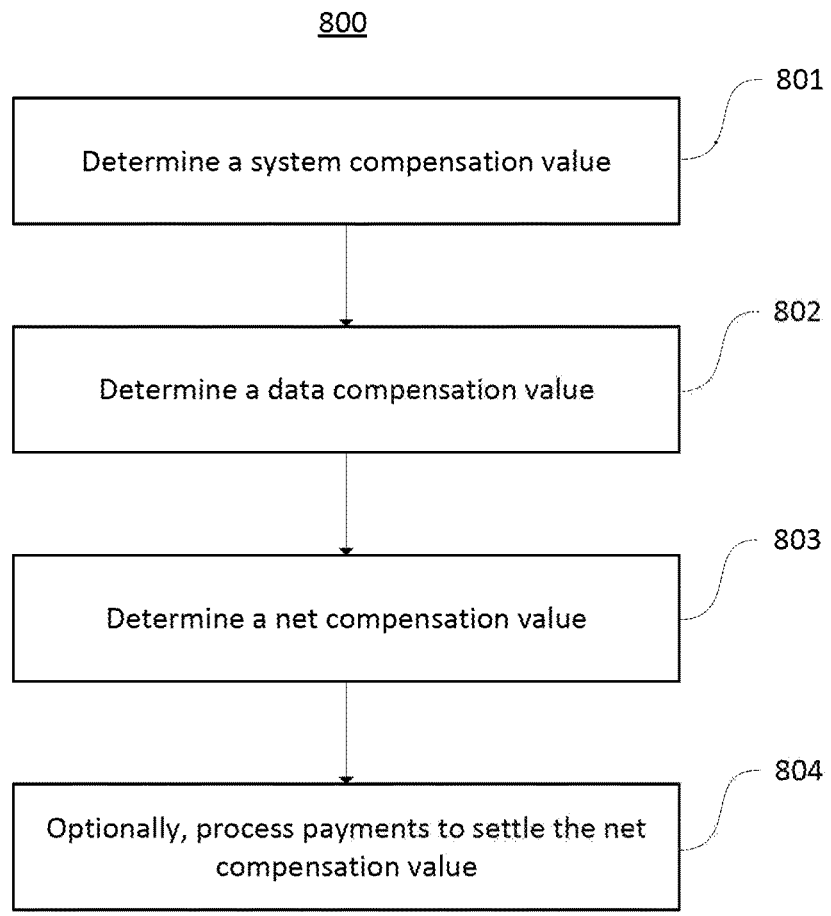
FIG. 8 illustrates an exemplary method of implementing compensation processing.

FIG. 8 illustrates an exemplary method 800 of implementing compensation processing. In step 801, a system compensation value is determined for use of software or resources during code analysis. The system compensation value may be determined based on size of the analyzed codebase, size of the analyzed programming activity data, number of users or collaborates working on the analyzed codebase, length of computation time, or other metrics related to scope of system usage.

In step 802, a data compensation value is determined for sharing of user data. The user may be credited for sharing data. For example, the user may receive a credit for allowing programming activity data to be used for code analysis requested by other users. The user may also receive a credit for allowing programming activity data such as source code to be viewed by other users. The user may also be charged for using data shared by other users. The charge may be determined by the number or size of data used.

In step 803, a net compensation value is determined. The net compensation value may be determined by combining the system compensation value and data compensation value.

In step 804, optionally, payment is processed to settle the net compensation value. The payment may be processed through a wire transfer, bank deposit, debit card, credit card, electronic payment, cryptocurrency transaction, or another payment mechanism. When the net compensation value is negative, payment may be electronically transferred from an account of the user to an account of an owner or manager of one or more remote nodes. When the net compensation value is positive, the user may receive payment. Payment may be electronically transferred from the account of an owner or manager of one or more remote nodes to an account of the user.

Figure 9:
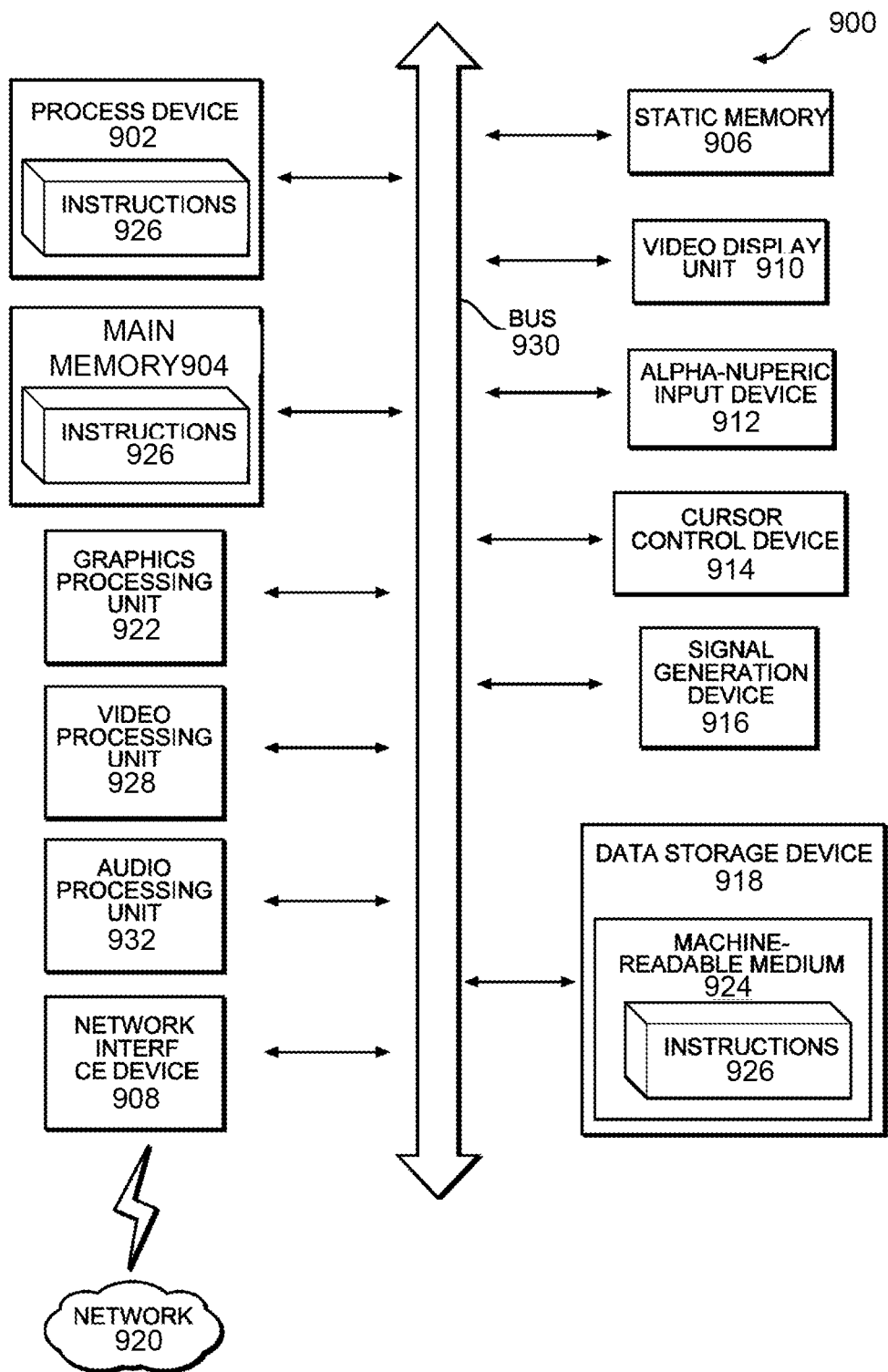
FIG. 9 illustrates an example computer system for use in some embodiments.

FIG. 9 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 915 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a computer-readable medium) on which is stored one or more sets of instructions or software 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In one implementation, the instructions 926 include instructions to implement functionality corresponding to the components of a device to perform the disclosure herein. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

It will be appreciated that the present disclosure may include any one and up to all of the following examples.

Example 1

A computer-implemented method comprising: collecting input data from a local computer, the input data including at least one of source code, recorded actions in an editor, recorded actions in a terminal, recorded actions in a web browser, or recorded actions in an emulator; receiving a request for code analysis; transmitting the input data and the request for code analysis to one or more remote nodes; performing, by the one or more remote nodes, analysis on the input data; receiving analysis results from the one or more remote nodes.

Example 2

The computer-implemented method of Example 1, wherein the collected input data includes data about a current file opened by a user and a current cursor position, selection range, or click location in the current file.

Example 3

The computer-implemented method of Example 1, wherein the collected input data includes information about recorded actions in the editor, the information including data about at last one of edits, selects, an open action on a file, or a tab switch event.

Example 4

The computer-implemented method of Example 3, wherein the collected input data is stored on the one or more remote nodes and is used by the one or more remote nodes to perform the analysis.

Example 5

The computer-implemented method of Example 1, wherein the collected input data includes information about input or output in the terminal.

Example 6

The computer-implemented method of Example 5, wherein the collected input data is stored on the one or more remote nodes and is used by the one or more remote nodes to perform the analysis.

Example 7

The computer-implemented method of Example 1, wherein the collected input data further includes an indication of a current directory or a value of one or more environment variables.

Example 8

The computer-implemented method of Example 1, wherein the collected input data includes information about input or output in the web browser.

Example 9

The computer-implemented method of Example 1, wherein the collected input data includes information about input or output in the emulator.

Example 10

The computer-implemented method of Example 1, further comprising: listening for a system event to determine when the source code has changed; in response to determining that the source code has changed, transmitting the source code to the one or more remote nodes.

Example 11

The computer-implemented method of Example 1, further comprising: storing a local cache; determining that the content of the source code is different from the content of a copy of the source code in the local cache and, in response, transmitting the source code to the one or more remote nodes.

Example 12

The computer-implemented method of Example 1, further comprising: recording a series of actions in the editor; identifying a series of events within a time range; discarding the events that occur within the time range and retaining only a beginning event and an ending event that begin and end the series of events.

Example 13

The computer-implemented method of Example 1, further comprising: calculating a diff of a first version of data with a second version of data; transmitting the result of the diff to the one or more remote nodes and not transmitting all of the first version of data to the one or more remote nodes.

Example 14

The computer-implemented method of Example 1, further comprising: presenting configuration options to a user, the configuration options allowing selection of data sources or event types for monitoring and transmission to the one or more remote nodes.

Example 15

The computer-implemented method of Example 1, further comprising: receiving an indication of a character sequence for removal; removing the character sequence from the input data prior to sending the input data to the one or more remote nodes.

Example 16

The computer-implemented method of Example 1, further comprising: using a predefined pattern to identify a character sequence for removal; removing the character sequence from the input data prior to sending the input data to the one or more remote nodes.

Example 17

The computer-implemented method of Example 1, further comprising: using a machine learning model to predict that a character sequence is sensitive; removing the character sequence from the input data prior to sending the input data to the one or more remote nodes.

Example 18

The computer-implemented method of Example 1, further comprising: encrypting the input data prior to transmission to the one or more remote nodes.

Example 19

The computer-implemented method of Example 1, further comprising: receiving, by the one or more remote nodes, the input data; determining, by the one or more remote nodes, a set of tasks to perform the requested code analysis; assigning, by the one or more remote nodes, the set of tasks to a plurality of worker nodes.

Example 20

The computer-implemented method of Example 1, further comprising: determining, by the local computer, a set of tasks to perform the requested code analysis; assigning, by the local computer, the set of tasks to a plurality of worker nodes.

Example 21

The computer-implemented method of Example 1, further comprising: receiving, by a first worker node in the one or more remote nodes, the input data; processing, by the first worker node, the input node to produce intermediate data; transmitting, by the first worker node, the intermediate data to a second worker node; processing, by the second worker node, the intermediate data to produce an analysis output.

Example 22

The computer-implemented method of Example 1, wherein the analysis performed by the one or more remote nodes is based on data from a data source, wherein the data source comprises at least a portion of a publicly accessible codebase.

Example 23

The computer-implemented method of Example 1, wherein the analysis performed by the one or more remote nodes is based on data from a data source, wherein the data source comprises at least a portion of a codebase of an individual user.

Example 24

The computer-implemented method of Example 1, further comprising: monitoring input from a user; prefetching analysis results from the network of remote nodes based on detecting in the monitored input a triggering event.

Example 25

The computer-implemented method of Example 1, further comprising: storing confidential input data of a plurality of users on the one or more remote nodes; monitoring the frequency of queries to the one or more remote nodes; using the frequency of queries to determine the confidentiality status of input data stored on the one or more remote nodes; returning results to users that are determined to be non-confidential.

Example 26

The computer-implemented method of Example 1, further comprising: computing a compensation amount for one or more owners of the one or more remote nodes; transmitting an electronic payment of the compensation amount to the one or more owners of the one or more remote nodes.

Example 27

The computer-implemented method of Example 1, further comprising: determining a compensation for a user of the local computer based on sharing of data from the local computer to the one or more remote nodes.

Example 28

The computer-implemented method of claim 1, further comprising: debiting a user of the local computer based on the amount of processing performed by the one or more remote nodes; crediting the user of the local computer based on sharing of data from the local computer to the one or more remote nodes.

Example 29

The computer-implemented method of claim 1, further comprising: using differential privacy, by the local computer, to determine data that will not expose confidential data on the local computer when the data is transmitted to the one or more remote nodes; transmitting the data to the one or more remote nodes.

Example 30

The computer-implemented method of claim 1, further comprising: using differential privacy, by the one or more remote nodes, to determine data that will not expose confidential data on the local computer when the code analysis is performed on the data or when the data is shared with other clients.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    collecting input data defining programming activity from a local computer, the input data including source code or recorded actions associated with the programming activity in an editor, a terminal, a web browser, or an emulator;
    receiving a request for code analysis from the local computer;
    transmitting the input data and the request for code analysis to one or more remote nodes;
    performing, by the one or more remote nodes, analysis on the input data via a trained machine learning model at the one or more remote nodes, the trained machine learning model being trained with example code and example actions correlated to example analysis results to enable the trained machine learning model to infer analysis results based on the input data; and
    receiving the analysis results from the one or more remote nodes at the local computer.

2. The computer-implemented method of claim 1, wherein the collected input data includes data about a current file opened by a user and a current cursor position, selection range, or click location in the current file.

3. The computer-implemented method of claim 1, wherein the collected input data includes information about recorded actions in the editor, the information including data about at least one of edits, selects, an open action on a file, or a tab switch event.

4. The computer-implemented method of claim 3, wherein the collected input data is stored on the one or more remote nodes and is used by the one or more remote nodes to perform the analysis.

5. The computer-implemented method of claim 1, wherein the collected input data includes information about input or output in the terminal.

6. The computer-implemented method of claim 5, wherein the collected input data is stored on the one or more remote nodes and is used by the one or more remote nodes to perform the analysis.

7. The computer-implemented method of claim 1, wherein the collected input data further includes an indication of a current directory or a value of one or more environment variables.

8. The computer-implemented method of claim 1, wherein the collected input data includes information about input or output in the web browser.

9. The computer-implemented method of claim 1, wherein the collected input data includes information about input or output in the emulator.

10. The computer-implemented method of claim 1, further comprising:
    listening for a system event to determine when the source code has changed;
    in response to determining that the source code has changed, transmitting the source code to the one or more remote nodes.

11. The computer-implemented method of claim 1, further comprising:
    storing a local cache;
    determining that the content of the source code is different from the content of a copy of the source code in the local cache and, in response, transmitting the source code to the one or more remote nodes.

12. The computer-implemented method of claim 1, further comprising:
    recording a series of actions in the editor;
    identifying a series of events within a time range;
    discarding the events that occur within the time range and retaining only a beginning event and an ending event that begin and end the series of events.

13. The computer-implemented method of claim 1, further comprising:
    calculating a diff of a first version of data with a second version of data;
    transmitting the result of the diff to the one or more remote nodes and not transmitting all of the first version of data to the one or more remote nodes.

14. The computer-implemented method of claim 1, further comprising:
    presenting configuration options to a user, the configuration options allowing selection of data sources or event types for monitoring and transmission to the one or more remote nodes.

15. The computer-implemented method of claim 1, further comprising:
    receiving an indication of a character sequence for removal;
    removing the character sequence from the input data prior to sending the input data to the one or more remote nodes.

16. The computer-implemented method of claim 1, further comprising:
    using a predefined pattern to identify a character sequence for removal;
    removing the character sequence from the input data prior to sending the input data to the one or more remote nodes.

17. The computer-implemented method of claim 1, further comprising:
    encrypting the input data prior to transmission to the one or more remote nodes.

18. The computer-implemented method of claim 1, further comprising:
    receiving, by the one or more remote nodes, the input data;
    determining, by the one or more remote nodes, a set of tasks to perform the requested code analysis;
    assigning, by the one or more remote nodes, the set of tasks to a plurality of worker nodes.

19. The computer-implemented method of claim 1, further comprising:
   determining, by the local computer, a set of tasks to perform the requested code analysis;
   assigning, by the local computer, the set of tasks to a plurality of worker nodes.

20. The computer-implemented method of claim 1, further comprising:
   receiving, by a first worker node in the one or more remote nodes, the input data;
   processing, by the first worker node, the input data to produce intermediate data;
   transmitting, by the first worker node, the intermediate data to a second worker node;
   processing, by the second worker node, the intermediate data to produce an analysis output.

21. The computer-implemented method of claim 1, wherein the analysis performed by the one or more remote nodes is based on data from a data source, wherein the data source comprises at least a portion of a publicly accessible codebase.

22. The computer-implemented method of claim 1, wherein the analysis performed by the one or more remote nodes is based on data from a data source, wherein the data source comprises at least a portion of a codebase of an individual user.

23. The computer-implemented method of claim 1, further comprising:
   monitoring input from a user;
   prefetching analysis results from the network of remote nodes based on detecting in the monitored input a triggering event.

24. The computer-implemented method of claim 1, further comprising:
   computing a compensation amount for one or more owners of the one or more remote nodes;
   transmitting an electronic payment of the compensation amount to the one or more owners of the one or more remote nodes.

25. The computer-implemented method of claim 1, further comprising:
   determining a compensation for a user of the local computer based on sharing of data from the local computer to the one or more remote nodes.

26. The computer-implemented method of claim 1, further comprising:
   debiting a user of the local computer based on the amount of processing performed by the one or more remote nodes;
   crediting the user of the local computer based on sharing of data from the local computer to the one or more remote nodes.

27. The computer-implemented method of claim 1, further comprising:
   using differential privacy, by the local computer, to determine data that will not expose confidential data on the local computer when the data is transmitted to the one or more remote nodes;
   transmitting the data to the one or more remote nodes.

28. The computer-implemented method of claim 1, further comprising:
   using differential privacy, by the one or more remote nodes, to determine data that will not expose confidential data on the local computer when the code analysis is performed on the data or when the data is shared with other clients.

29. A computer-implemented method comprising:
   collecting input data from a local computer, the input data including at least one of source code, recorded actions in an editor, recorded actions in a terminal, recorded actions in a web browser, or recorded actions in an emulator;
   receiving a request for code analysis;
   transmitting the input data and the request for code analysis to one or more remote nodes;
   performing, by the one or more remote nodes, analysis on the input data;
   receiving analysis results from the one or more remote nodes;
   using a machine learning model to predict that a character sequence is sensitive; and
   removing the character sequence from the input data prior to sending the input data to the one or more remote nodes.

30. A computer-implemented method comprising:
   collecting input data from a local computer, the input data including at least one of source code, recorded actions in an editor, recorded actions in a terminal, recorded actions in a web browser, or recorded actions in an emulator;
   receiving a request for code analysis;
   transmitting the input data and the request for code analysis to one or more remote nodes;
   performing, by the one or more remote nodes, analysis on the input data;
   receiving analysis results from the one or more remote nodes;
   storing confidential input data of a plurality of users on the one or more remote nodes;
   monitoring the frequency of queries to the one or more remote nodes;
   using the frequency of queries to determine the confidentiality status of input data stored on the one or more remote nodes; and
   returning results to users that are determined to be non-confidential.

* * * * *